United States Patent [19]

Ruderer et al.

[11] Patent Number: 5,208,191

[45] Date of Patent: May 4, 1993

[54] CRYSTALLIZING ENAMEL COMPOSITION AND METHOD OF MAKING AND USING THE SAME

[75] Inventors: Clifford G. Ruderer; Robert C. Stroup, both of Pittsburgh; George C. Korn, Coraopolis, all of Pa.

[73] Assignee: Ferro Corporation, Cleveland, Ohio

[21] Appl. No.: 799,389

[22] Filed: Nov. 27, 1991

Related U.S. Application Data

[63] Continuation-in-part of Ser. No. 579,301, Sep. 7, 1990, Pat. No. 5,153,150.

[51] Int. Cl.$^5$ ............................ C03C 8/04; C03C 8/14
[52] U.S. Cl. ........................................ 501/17; 501/32; 501/14; 501/20; 501/72
[58] Field of Search ...................... 501/17, 32, 20, 72, 501/14

[56] References Cited

U.S. PATENT DOCUMENTS

| | | | |
|---|---|---|---|
| 2,920,971 | 1/1960 | Stookey | 106/39 |
| 3,113,878 | 12/1968 | Martin | 106/54 |
| 4,196,004 | 4/1980 | Berretz | 106/48 |
| 4,224,627 | 9/1980 | Powell et al. | 346/75 |
| 4,282,026 | 8/1981 | McMaster et al. | 65/273 |
| 4,310,357 | 1/1982 | Matsuura et al. | 501/15 |
| 4,365,021 | 12/1982 | Pirooz | 501/15 |
| 4,522,925 | 6/1985 | Pirooz | 501/15 |
| 4,596,590 | 6/1986 | Boaz | 65/60.51 |
| 4,684,389 | 8/1987 | Boaz | 65/24 |
| 4,837,383 | 6/1989 | Andrews | 427/108 |
| 4,882,301 | 11/1989 | Gettys et al. | 501/17 |
| 4,975,301 | 12/1990 | Andrews et al. | 427/126.2 |
| 4,983,196 | 1/1991 | Stotka | 65/24 |
| 5,001,087 | 3/1991 | Kubota et al. | 501/17 |

FOREIGN PATENT DOCUMENTS

| | | |
|---|---|---|
| 577383 | 6/1959 | Canada. |
| 0370683 | 5/1990 | European Pat. Off.. |
| 41-12220 | 7/1966 | Japan. |
| 54-20018 | 2/1979 | Japan. |
| 1-212249 | 8/1989 | Japan. |
| 2-102147 | 4/1990 | Japan. |
| 2-133336 | 5/1990 | Japan. |

OTHER PUBLICATIONS

N. Irving Sax et al., "Hawley's Condensed Chemical Dictionary", Eleventh Edition, copyright 1987 by Van Nostrand Reinhold Compnay, Inc., pp. 842 and 1031.
W. D. Kingery, "Introduction to Ceramics", copyright 1960 by John Wiley & Sons, Inc., pp. 305-309.

*Primary Examiner*—Mark L. Bell
*Assistant Examiner*—C. M. Bonner
*Attorney, Agent, or Firm*—Renner, Otto, Boisselle & Sklar

[57] ABSTRACT

The present invention provides a new and useful enamel composition and method of using the same for producing an enamel finish on a formed section of glass. The enamel composition partially crystallizes upon heating, thereby helping to prevent the forming and handling equipment from sticking and/or adhering to the composition during the forming operation. The enamel composition includes a crystallizable glass frit portion and a seed powder. The crystallized glass frit portion includes precursors from which $Zn_2SiO_4$ can be crystallized upon firing of the enamel composition. The seed powder causes at least a portion of the precursors to crystallize upon firing such that during firing at least a part of the crystallizable glass frit yields crystallized $Zn_2SiO_4$. The enamel composition also preferably includes bismuth oxide ($Bi_2O_3$) in order to help further ensure that no sticking and/or adhering problems develop during the forming operation.

18 Claims, No Drawings

CRYSTALLIZING ENAMEL COMPOSITION AND METHOD OF MAKING AND USING THE SAME

RELATED APPLICATIONS

This application is a continuation-in-part of application Ser. No. 07/579,301 filed Sep. 7, 1990 entitled "Crystallizing Enamel Composition and Method of Using the Same", now U.S. Pat. No. 5,153,150, issued Oct. 6, 1992.

TECHNICAL FIELD OF INVENTION

The present invention concerns a composition for use in producing an enamel finish and a method of making and using the same. More particularly, the invention concerns an enamel composition for use in producing an enamel finish on a formed section of glass wherein the enamel composition partially crystallizes upon heating of the section of glass thereby facilitating the forming operation.

BACKGROUND

As set forth in Gettys et al. U.S. Pat. No. 4,882,301, glass sections for automobiles, trucks or other automotive conveyance devices, including, for example, side and rear lights or windows, and windshields, are many times produced with varying degrees of curvature as opposed to flat, planar surfaces. If a curvature is desired in a given section, it is heated to a temperature in the vicinity of about 1300° F., at which point it is ready to be subjected to a bending or curving stress employing any number of suitable molding or pressing techniques. The section of glass, during the bending operation, maintains sufficient surface hardness such that the press head of the equipment employed to bend or curve the glass or the vacuum head utilized to pick up and transport the section of glass does not disturb the surface of the glass with which it contacts.

Automotive manufacturers have found that the appearance of a section of glass is greatly enhanced by applying a relatively narrow, opaque, colored band or border around the edge of the section of glass, along the inner surface. This band, which frames the edge of the inner surface of the section of glass, may vary anywhere from about an inch to about six inches in width. By blocking the passage of sunlight this band also serves to prevent the degradation of underlying adhesives by U.V. radiation.

Because of its relative durability, it has been found that the colored band is best produced through the use of a composition that forms an enamel during the heating and forming of the section of glass. As discussed in U.S. Pat. No. 4,882,301, preferably the composition which is utilized to form the enamel is such that it prevents the press or vacuum head of the equipment utilized to bend or transport the section of glass from sticking to the enamel and/or disturbing the surface of the enamel.

As set forth in U.S. Pat. No. 4,882,301 there are essentially two ways to help prevent the press or vacuum head from sticking to the glass enamel. More particularly, either a large amount of precursors of $Zn_2SiO_4$ or $Cd_2SiO_4$ may be incorporated into the composition utilized to produce the enamel (i.e., large amounts of ZnO, $SiO_2$ or CdO may be included in the composition), or a significant amount of crystalline $Zn_2SiO_4$ or $Cd_2SiO_4$ may be utilized in the composition (i.e., from about 25 percent by weight to about 50 percent by weight $Cd_2SiO_4$ or $Zn_2SiO_4$ may be included in the composition). Successful results have been obtained when using CdO as a precursor as disclosed in U.S. Pat. No. 4,882,301. However, in light of recent environmental restrictions and concerns, cadmium is sometimes not preferred for use in industry. Unfortunately, when zinc is substituted for the cadmium, the results have been less than desirable. Specifically, when either significant amounts of the precursors of $Zn_2SiO_4$ or crystalline $Zn_2SiO_4$ itself have been substituted for the cadmium, the melting temperature of the composition has been adversely affected and/or the vacuum or press head has stuck to and/or visually impaired the surface of the enamel.

SUMMARY OF INVENTION

The present invention provides a new and useful enamel composition for producing an enamel layer or finish which affords various distinct advantages over the prior art enamel forming compositions. More particularly, the present invention provides a new and useful cadmium-free enamel composition for forming an enamel finish on the surface of a formed section of glass which facilitates the forming of the glass. Specifically, the enamel composition serves to prevent the glass forming and handling equipment from sticking and/or adhering to the enamel composition while the section of glass and the enamel composition are being simultaneously fired and formed. Similarly, the enamel composition serves to prevent the glass forming and handling equipment from disturbing the surface of the enamel finish formed by the enamel composition.

In a preferred embodiment the enamel composition comprises a crystallizable glass frit portion including precursors from which $Zn_2SiO_4$ can be crystallized upon firing of the enamel composition at temperatures at which glass sections are generally formed. The precursors comprise from about 35 percent by weight to about 100 percent by weight of the crystallizable glass frit portion of the enamel composition. More particularly, at least 30 percent by weight of the precursors comprise ZnO and at least 5 percent by weight of the precursors comprise $SiO_2$. The crystallizable glass frit portion comprises at least 10 percent by weight of the solids portion of the enamel composition. Preferably, the crystallizable glass frit portion comprises at least about 20 percent by weight of the solids portion of the enamel composition. As used herein this specification the "solids portion" of the enamel composition is that part of the enamel composition prior to firing exclusive of fillers, pigments and vehicles or carriers.

The enamel composition also includes a seed powder which causes at least a portion of the precursors to crystallize during firing such that subsequent to firing at least about 2 percent by weight of the crystallizable glass frit portion yields crystallized $Zn_2SiO_4$ formed by the precursors. The seed powder preferably comprises crystalline $Zn_2SiO_4$. Also, in order to further ensure that sticking does not occur, preferably the enamel composition includes a separate and distinct addition or quantity of bismuth oxide ($Bi_2O_3$). The $Bi_2O_3$ comprises from about a trace amount to about 60 percent by weight of the solids portion of the enamel composition. Preferably, the $Bi_2O_3$ comprises from about 5 percent by weight to about 50 percent by weight of the solids portion of the enamel composition. As used herein this specification and the claims below the term "trace amount" means at least about 0.005 weight percent.

The foregoing and other features of the invention are hereinafter more fully described and particularly pointed out in the claims. The following description setting forth in detail certain illustrative embodiments of the invention, these being indicative, however, of but a few of the various ways in which the principles of the invention may be employed.

DETAILED DESCRIPTION

An enamel composition made in accordance with the principles of the present invention, for use in producing a layer of enamel or an enamel finish or band upon a section of glass at typical glass forming temperatures, comprises a crystallizable glass frit portion and a seed powder. The crystallizable glass frit portion includes precursors from which $Zn_2SiO_4$ can be crystallized upon heating or firing of the enamel composition. The seed powder causes at least a portion of the precursors to crystallize upon firing such that subsequent to firing at least about 2 percent by weight of the crystallizable glass frit portion yields crystallized $Zn_2SiO_4$ formed by the precursors.

The precursors include ZnO and $SiO_2$. The ZnO comprises from at least about 30 percent by weight of the crystallizable glass frit portion of the enamel composition. Preferably, the ZnO comprises from about 40 percent by weight to about 70 percent by weight of the crystallizable glass frit portion of the enamel composition. More preferably, the ZnO comprises from about 50 percent by weight to about 65 percent by weight of the crystallizable glass frit portion. The $SiO_2$ comprises at least about 5 percent by weight to about 15 percent by weight of the crystallizable glass frit portion of the enamel composition. More preferably, the $SiO_2$ comprises from about 10 percent by weight to about 15 percent by weight of the crystallizable glass frit portion of the enamel composition.

It will be appreciated that all references made herein this specification and the claims below to precursors such as "ZnO", "$SiO_2$" and "CdO", or any other components of a glass frit, do not imply and molecular structure or order to the atoms that comprise the precursors or components, unless otherwise indicated. Thus, the references made herein to, for example, "ZnO" instead of "Zn" and "O", are merely an attempt to conform to conventional practices commonly employed by persons in the glass or frit industries when referring to the chemical composition or makeup of a glass.

The seed powder comprises a crystalline material which causes the precursors to form crystalline $Zn_2SiO_4$ upon firing of the composition at glass forming temperatures and times normally employed in the art. Preferably, the seed powder comprises crystalline $Zn_2SiO_4$. Preferably, the crystalline $Zn_2SiO_4$ comprises at least about 50 percent by weight of the seed powder. More preferably, the crystalline $Zn_2SiO_4$ comprises at least about 90 percent by weight of the seed powder.

In addition to the seed powder and a crystallizable frit, the enamel composition may also include one or more pigments, one or more noncrystallizable glass frits, one or more fillers and a suitable vehicle or carrier which allows the enamel composition to take the form appropriate for application of the enamel composition to a section of glass such as, for example, a slurry, a paste or a thermoplastic pellet.

It will be appreciated that the crystallizable glass frit portion of the enamel composition may comprise more than one frit. Thus, the crystallizable glass frit portion may comprise two or more glass frits containing both the precursors ZnO and $SiO_2$. The crystallizable glass frit portion comprises at least about 5 percent by weight of the resultant enamel finish or composition subsequent to firing and at least about 10 percent by weight of the solids portion of the enamel composition. Preferably, the crystallizable glass frit comprises at least about 10 percent by weight of the resultant enamel finish or composition subsequent to firing and at least about 15 percent by weight of the solids portion of the enamel composition. More preferably, the crystallizable glass frit comprises from about 10 percent by weight to about 60 percent by weight of the resultant enamel finish or composition subsequent to firing and from about 15 percent by weight to about 70 percent by weight of the solids portion of the enamel composition.

The seed powder is present in the composition in an amount comprising at least about 1 percent by weight of the crystallizable glass frit portion. Preferably, the seed powder is present in the composition in an amount comprising from about 5 percent by weight to about 50 percent by weight of the crystallizable glass frit portion. More preferably, the seed powder is present in the enamel composition in an amount comprising from about 10 percent by weight to about 40 percent by weight of the crystallizable glass frit portion.

The seed powder includes a particle size of less than about 40 microns. Preferably, the average particle size of the seed powder is less than about 10 microns. More preferably, the average particle size of the seed powder is less than about 5 microns.

In order to further help ensure that sticking and/or adhering problems do not develop preferably the enamel composition includes a separate addition of $Bi_2O_3$. By the term "separate" applicants mean the addition of $Bi_2O_3$ to the enamel composition through an addition exclusive of any $Bi_2O_3$ that may be contained in any of the glass frits that make up the enamel composition. The $Bi_2O_3$ comprises from about a trace amount to about 60 percent of the solids portion of the enamel composition. Preferably, the $Bi_2O_3$ comprises from about 5 percent by weight to about 50 percent by weight of the solids portion of the enamel composition. More preferably, the $Bi_2O_3$ comprises from about 10 percent about 45 percent by weight of the solids portion of the enamel composition.

The enamel composition is utilized in the production of a section of formed decorated glass by first mixing the crystallizable glass frit, the seed powder, and one or more fillers, vehicles, noncrystallizable glass frits and pigments if so desired, so as to produce a form appropriate for application of the enamel composition to a section of glass. The vehicle or carrier preferably comprises a solvent and a resin. Optionally, the vehicle or carrier may also comprise a thixotrope and a wetting agent in order to facilitate the application of the enamel composition to the section of glass.

Examples of potential suitable resins include ethyl cellulose, ethyl hydroxy ethyl cellulose, wood rosin, mixtures of ethyl cellulose and phenolic resins, polymethacrylates of lower alcohols and monobutyl ether of ethylene glycol monoacetate.

Examples of potential suitable solvents include terpenes such as alpha- or beta-terpineol or mixtures thereof with other solvents such as kerosene, dibutyl phthalate, butyl carbitol, butyl carbitol acetate, hexylene glycol and high-boiling alcohols and alcohol esters. Various combinations of these and other solvents may be formulated to obtain the desired viscosity and volatility requirements for each application.

Examples of potential suitable thixotropic agents include organic based thixotropics such as, for example, hydrogenated castor oil and derivatives thereof and ethyl cellulose.

Examples of potential suitable wetting agents include fatty acid esters, for example, N-tallow-1,3-diaminopropane di-oleate, N-tallow trimethylene diamine diacetate, N-coco trimethylene diamine, beta diamines, N-oleyl trimethylene diamine, N-tallow trimethylene diamine, and/or N-tallow trimethylene diamine di-oleate.

Examples of potential suitable pigments include copper chromite black sold under the trade designation K-384, cobalt aluminate blue sold under the trade designation V-3285, zinc iron chromite brown sold under the trade designation K-100, and iron cobalt chromite black sold under the trade designation F-6340, all sold by the Ferro Corporation of Cleveland, Ohio. The pigment generally accounts for about 5 percent by weight to about 15 percent by weight of the enamel composition.

Examples of potential suitable fillers include alumina ($Al_2O_3$) and silicon dioxide ($SiO_2$). Fillers generally comprise less than about 10 percent, and preferably less than about 5 percent by weight of the enamel composition.

The solids portion of the enamel composition comprises at least about 40 percent by weight of the enamel composition. Preferably, the solids portion comprises at least about 60 percent by weight of the enamel composition. More preferably, the solids portion comprises at least about 70 percent by weight of the enamel composition.

Subsequent to the application of the enamel composition the section of glass is then heated to a temperature of from about 900° F. to about 1400° F. and then formed to a desired shape. Generally, the step of heating and forming the section of glass is carried out simultaneously or at substantially the same time. Such forming may be carried out utilizing a press device which may include a head covered with a material such as FIBERFRAX refractory fiber. FIBERFRAX is a registered trademark for refractory fiber owned by the Stemcor Corporation of Cleveland, Ohio.

During the forming operation the refractory fiber contacts the layer of enamel composition and the applicants believe that the crystallization of $Zn_2SiO_4$ that occurs during heating helps to prevent the refractory fiber from sticking to the composition and/or causing the surface of the resultant enamel finish produced by the enamel composition from becoming disrupted or disturbed. Similarly, generally the vacuum head utilized to transport the glass is covered with a refractory fiber such as FIBERFRAX refractory fiber and applicants believe that the crystallization that occurs during heating helps to prevent the refractory fiber from sticking to the enamel composition and/or causing the surface of the resultant enamel finish from becoming disrupted or disturbed. Applicants believe that possibly the presence of the separate addition of $Bi_2O_3$ in the enamel composition may somehow promote the crystallization process and thus further help to prevent sticking and/or adhering problems.

An enamel composition made in accordance with the principles of the present invention which may be successfully utilized to produce a section of decorated formed glass is as follows:

EXAMPLE I

| Components | Percent by Weight |
|---|---|
| Crystallizable glass frit portion | 20.8 |
| Conventional glass frit | 40.0 |
| Seed powder | 3.2 |
| Pigment | 16.0 |
| Vehicle | 20.0 |

In the above example the seed powder comprises about 100 percent by weight crystalline $Zn_2SiO_4$. The crystallizable glass frit portion comprises a single glass frit comprising about 63.2 percent by weight ZnO, about 24.5 percent by weight $B_2O_3$ and about 12.3 percent by weight $SiO_2$. Pigments may include, for example, copper chromite black, titanium dioxide white, cobalt aluminate blue, zinc iron chromite brown or other suitable pigments required to produce the desired color. The seed powder preferably includes an average particle size of about 1.6 microns.

The conventional glass frit may comprise any one of a variety of conventional glass frits or mixtures thereof. Generally, the specific glass frit utilized is selected on the basis of various parameters associated with a particular application. More particularly, the specific conventional glass frit employed is generally selected on a basis of, for example, firing temperatures and times, the dimensions of the section of glass being formed, the degree of and time required for forming, and the type of enamel finish required.

The following additional example will serve to further illustrate the novel features and advantages of the invention. While these examples will show one skilled in the art how to operate within the scope of this invention, they are not to serve as a limitation on the scope of the invention for such scope is only defined in the claims below.

EXAMPLE II

The following solid portions may be prepared utilizing the various components and percentages as shown below in Table I to provide four separate solids portion compositions. All percentages shown in Table I are parts by weight.

TABLE I

| | % Weight | % $SiO_2$ | % ZnO |
|---|---|---|---|
| Composition 1 | | | |
| [1]PF-83 | 0.235 | 0.068 | .000 |
| [1]PF-220 | 0.306 | 0.038 | 0.193 |
| $Zn_2SiO_4$ | 0.047 | 0.013 | 0.034 |
| [2]$Bi_2O_3$ | 0.412 | | |
| | 1.000 | | |
| Composition 2 | | | |
| [1]PP-75 | 0.282 | 0.082 | 0.000 |
| [1]PF-220 | 0.376 | 0.046 | 0.238 |
| $Zn_2SiO_4$ | 0.059 | 0.016 | 0.043 |
| [2]$Bi_2O_3$ | 0.283 | | |
| | 1.000 | | |
| Composition 3 | | | |
| [1]PF-83 | 0.235 | 0.059 | 0.000 |
| [1]PF-220 | 0.306 | 0.038 | 0.193 |
| $Zn_2SiO_4$ | 0.047 | 0.013 | 0.034 |
| [2]$Bi_2O_3$ | 0.412 | | |
| | 1.000 | | |
| Composition 4 | | | |
| [1]FS-0083 | 0.282 | 0.071 | 0.000 |

TABLE I-continued

|  | % Weight | % SiO$_2$ | % ZnO |
|---|---|---|---|
| [1]FS-0220 | 0.376 | 0.046 | 0.238 |
| Zn$_2$SiO$_4$ | 0.059 | 0.016 | 0.043 |
| [2]Bi$_2$O$_3$ | 0.283 | | |
| | 1.000 | | |

[1]These glass compositions which are identified by their respective trade designations are available from the Ferro Corporation of Cleveland, Ohio.
[2]The Bi$_2$O$_3$ is preferably at least 99.0% pure. Bi$_2$O$_3$ is available from the Transelco Division of the Ferro Corporation of Cleveland, Ohio.

76 grams of each of the above solids portion compositions 1-4 may be mixed by use of an automatic muller with the following components shown in Table II below to render four 100 g batches of enamel composition made in accordance with the principles of the present invention.

TABLE II

|  | Weight |
|---|---|
| Vehicle | 10 grams |
| [1]C-26 Vehicle | |
| Pigment | 14 grams |

[1]Available under the trade designation of C-26 from the Ferro Corporation of Cleveland, Ohio.

The above enamel composition may be fired at temperatures ranging from about 1050° F. to about 1250° F. Preferably, the enamel compositions are fired at about 1175° F.

Although the invention has been shown and described with respect to certain preferred embodiments, it is obvious that equivalent alterations and modifications will occur to others skilled in the art upon their reading and understanding of the specification. The present invention includes all such equivalent alterations and modifications, and is limited only by the scope of the following claims.

What is claimed is:

1. An enamel composition which during firing forms an enamel, said enamel composition comprising a solids portion, said solids portion comprising:
   A. at least 10 percent by weight of a crystallizable glass frit portion including at least 35 percent by weight precursors from which Zn$_2$SiO$_4$ can be crystallized upon firing of said composition;
   B. a seed powder which causes at least a portion of said precursors to crystallize upon firing such that during firing at least 2 percent by weight of said crystallizable glass frit yields crystallized Zn$_2$SiO$_4$ formed by said precursors; and
   C. a separate addition of Bi$_2$O$_3$.

2. An enamel composition as set forth in claim 1 wherein said precursors comprise ZnO and at least a portion of said ZnO during firing forms said crystallized Zn$_2$SiO$_4$.

3. An enamel composition as set forth in claim 1 wherein said precursors comprise SiO$_2$ and at least a portion of said SiO$_2$ during firing forms said crystallized Zn$_2$SiO$_4$.

4. An enamel composition as set forth in claim 1 wherein said precursors comprise ZnO, and said ZnO comprises from about 30 percent by weight to about 75 percent by weight of said crystallizable glass frit portion, and said enamel composition is substantially free of cadmium (Cd).

5. An enamel composition as set forth in claim 1 wherein said precursors comprise ZnO, and said ZnO comprises from about 40 percent by weight to about 70 percent by weight of said crystallizable glass frit portion.

6. An enamel composition as set forth in claim 1 wherein said precursors comprise ZnO, and said ZnO comprises from about 50 percent by weight to about 65 percent by weight of said crystallizable glass frit portion.

7. An enamel composition as set forth in claim 1 wherein said precursors comprise SiO$_2$, and said SiO$_2$ comprises from about percent by weight to about 20 percent by weight of said crystallizable glass frit portion.

8. An enamel composition as set forth in claim 1 wherein said precursors comprise SiO$_2$, and said SiO$_2$ comprises from percent by weight to about 15 percent by weight of said crystallizable glass frit portion.

9. An enamel composition as set forth in claim 1 wherein said precursors comprise SiO$_2$, and said SiO$_2$ comprises from about 10 percent by weight to about 15 percent by weight of said crystallizable glass frit portion.

10. An enamel composition as set forth in claim 1 wherein said seed powder is present in said enamel composition in an amount comprising at least about 1 percent by weight of said crystallizable glass frit portion.

11. An enamel composition as set forth in claim 1 wherein said seed powder is present in said enamel composition in an amount comprising from about 5 percent to about 50 percent by weight of said crystallizable glass frit portion.

12. An enamel composition as set forth in claim 1 wherein said seed powder is present in said enamel composition in an amount comprising from about 10 to about 40 percent by weight of said crystallizable glass frit portion.

13. An enamel composition as set forth in claim 1 wherein the average particle size of said seed powder is less than about 40 microns and said Bi$_2$O$_3$ comprises from about a trace amount to about 60 percent by weight of said solids portion.

14. An enamel composition as set forth in claim 1 wherein the average particle size of said seed powder is less than about 10 microns and said Bi$_2$O$_3$ comprises from about 5 percent by weight to about 50 percent by weight of said solids portion.

15. An enamel composition as set forth in claim 1 wherein said seed powder comprises a crystalline material which causes said precursors to form crystalline Zn$_2$SiO$_4$ upon firing of said enamel composition, said seed powder having an average particle size less than about 5 microns and said Bi$_2$O$_3$ comprises from about 10 percent by weight to about 45 percent by weight of said solids portion.

16. An enamel composition as set forth in claim 1 wherein said seed powder comprises crystalline Zn$_2$SiO$_4$.

17. An enamel composition as set forth in claim 1 including at least one pigment, at least one filler, at least one vehicle and at least one noncrystallizable glass frit.

18. An enamel composition which upon firing forms a glass enamel, said enamel composition comprising:
   A. at least 10 percent by weight of a crystallizable glass frit portion including precursors from which Zn$_2$SiO$_4$ can be crystallized upon firing of said enamel composition, said precursors comprising from about 35 percent by weight to about 100 percent by weight of said crystallizable glass frit portion with at least 30 percent by weight of said precursors comprising ZnO and at least 5 percent by weight of said precursors comprising $SiO_2$;

B. a seed powder which causes at least a portion of said precursors to crystallize upon firing such that during firing at least about 2 percent by weight of said crystallizable glass frit portion yields crystallized $Zn_2SiO_4$ formed by said precursors, said seed powder consisting essentially of crystalline $Zn_2SiO_4$; and C. a separate addition of $Bi_2O_3$.

* * * * *